United States Patent
Arvidson et al.

(10) Patent No.: US 10,743,343 B2
(45) Date of Patent: Aug. 11, 2020

(54) NETWORK NODE AND METHODS IN A MESH NETWORK

(71) Applicant: Telefonaktiebolaget LM Ericsson (publ), Stockholm (SE)

(72) Inventors: Pontus Arvidson, Danderyd (SE); Roman Chirikov, Stockholm (SE); Piergiuseppe di Marco, Sollentuna (SE); Per Skillermark, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 147 days.

(21) Appl. No.: 15/777,240

(22) PCT Filed: Apr. 12, 2018

(86) PCT No.: PCT/SE2018/050373
§ 371 (c)(1),
(2) Date: May 18, 2018

(87) PCT Pub. No.: WO2019/093937
PCT Pub. Date: May 16, 2019

(65) Prior Publication Data
US 2020/0029360 A1    Jan. 23, 2020

Related U.S. Application Data

(60) Provisional application No. 62/584,960, filed on Nov. 13, 2017.

(51) Int. Cl.
*H04W 74/08* (2009.01)
*H04L 12/753* (2013.01)
(Continued)

(52) U.S. Cl.
CPC ............. *H04W 74/08* (2013.01); *H04W 4/80* (2018.02); *H04W 48/10* (2013.01); *H04W 84/18* (2013.01)

(58) Field of Classification Search
CPC ....... H04W 74/08; H04W 48/10; H04W 4/80; H04W 84/18
See application file for complete search history.

(56) References Cited

U.S. PATENT DOCUMENTS

| 8,737,917 B2 | 5/2014 | Desai et al. |
| 2010/0220699 A1* | 9/2010 | Gopalakrishnan ........... H04W 74/0816 370/338 |

(Continued)

FOREIGN PATENT DOCUMENTS

EP    3030011 A1    6/2016

*Primary Examiner* — Kiet Tang
(74) *Attorney, Agent, or Firm* — Murphy, Bilak & Homiller, PLLC

(57) ABSTRACT

A method performed by a first network node for reducing the number of colliding transmissions in a mesh network is provided. The first network node and the second network node are configured to use periodic advertising for transmissions in the mesh network. The first network node calculates (402a) a first duration related to a transmission of data of a first size to be transmitted to the second network node. The first network node further calculates (402b) a second duration related to a period of time until a reception or a transmission of data is scheduled for second network node will occur. Based on the first and second duration the first network node decides (403) whether or not to decrease the first size of the transmission to a second size, so that first duration becomes shorter than the second duration. The first network then performs (404) the transmission according to the outcome of the deciding (403).

17 Claims, 13 Drawing Sheets

(51) Int. Cl.
    *H04L 12/939*     (2013.01)
    *H04L 12/715*     (2013.01)
    *H04W 4/80*     (2018.01)
    *H04W 48/10*     (2009.01)
    *H04W 84/18*     (2009.01)

(56) References Cited

U.S. PATENT DOCUMENTS

2015/0098459 A1* 4/2015 Lee ..................... H04W 48/14
    370/338
2018/0160384 A1* 6/2018 Su ..................... H04W 74/0816

* cited by examiner

■ Transmission, link layer overhead

▨ Transmission, link layer payload

⬚ Scheduled reception

Planned transmission

Adapted transmission

■ Transmission, link layer overhead

▨ Transmission, link layer payload

▢ Scheduled reception

Planned transmission

Adapted transmission

Planned transmission

Adapted transmission

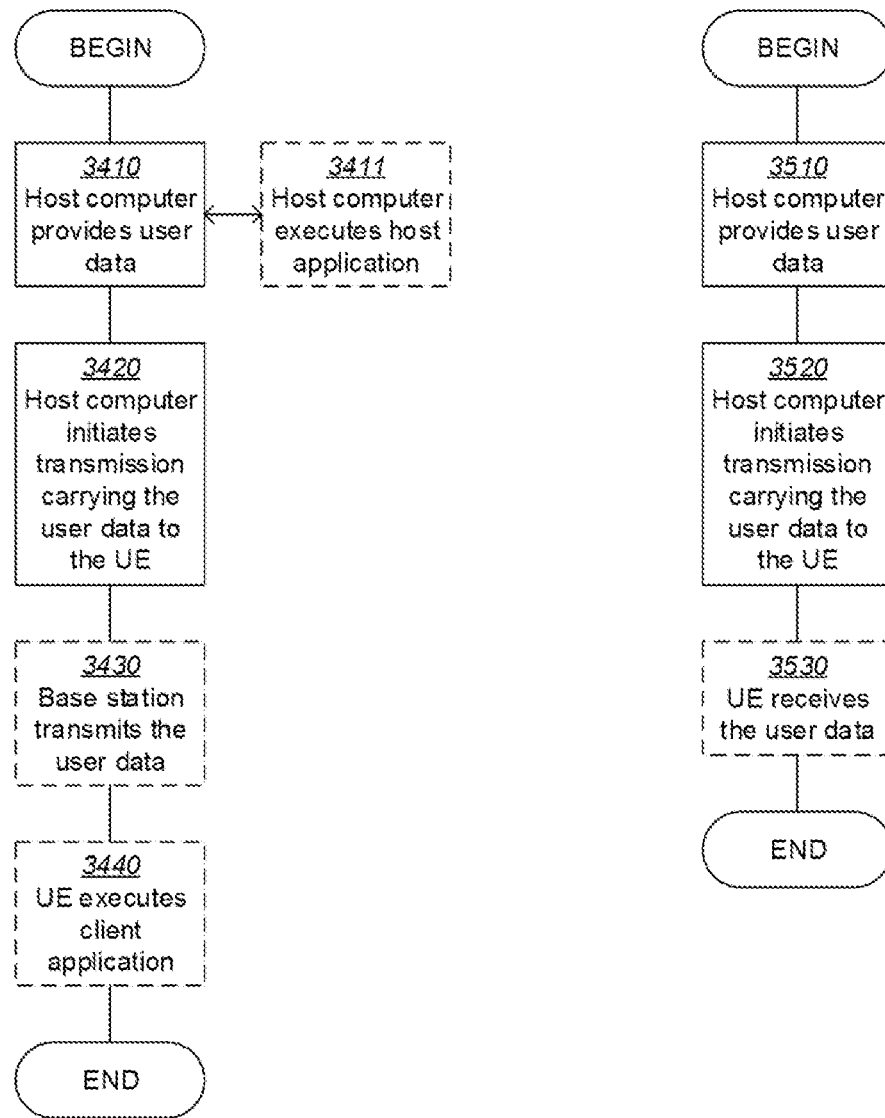

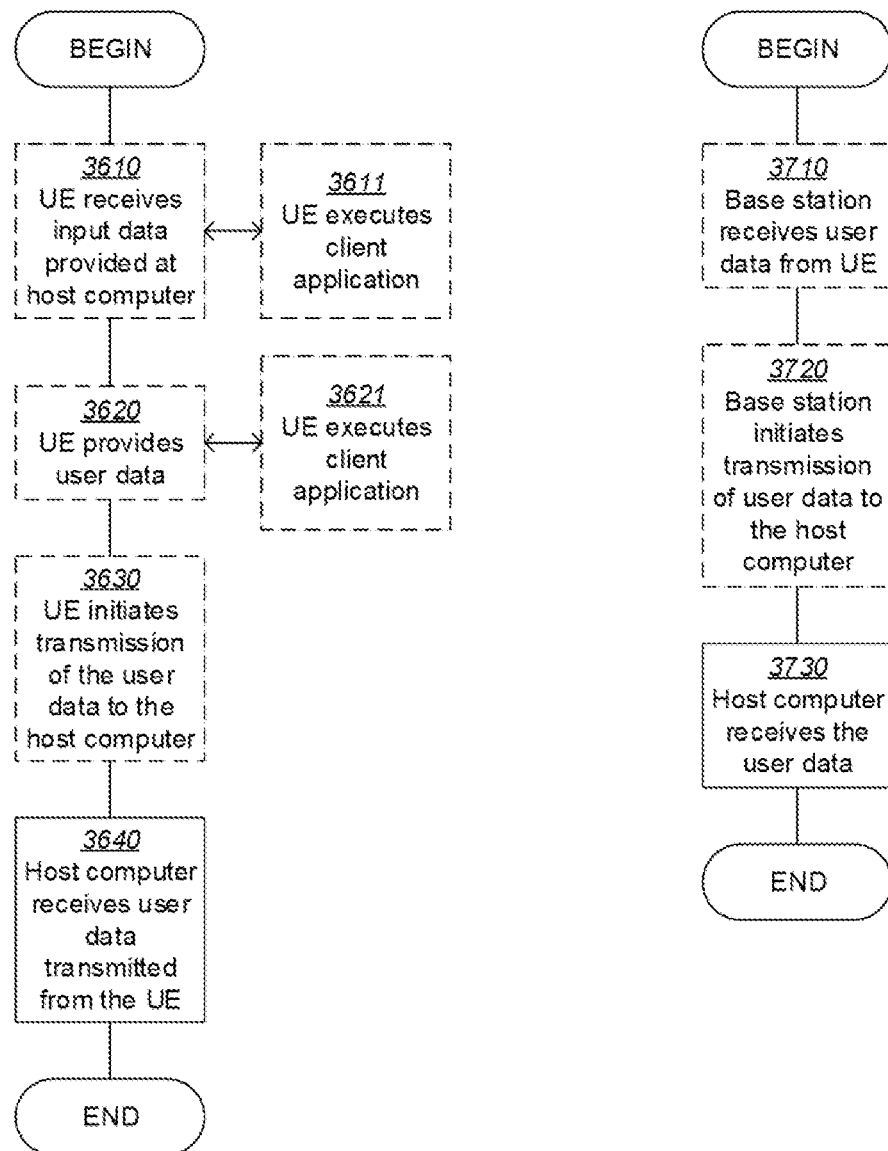

NETWORK NODE AND METHODS IN A MESH NETWORK

BACKGROUND

A mesh network is a local network topology in which infrastructure nodes connect directly, dynamically and non-hierarchically to as many other nodes as possible and cooperate with one another to efficiently route data from and/or to clients. Mesh networks dynamically self-organize and self-configure, which may reduce installation overhead. The ability to self-configure enables dynamic distribution of workloads, particularly in the event that a few nodes should fail. This in turn contributes to fault-tolerance and reduced maintenance costs.

Version 1.0 of the Bluetooth Mesh Profile specification was released in July 2017. In this first release of Bluetooth Mesh, which works over Bluetooth Low Energy (BLE) core specification v4.0 or later, mesh messages are exchanged over a bearer referred to as the advertising bearer. The advertising bearer utilizes connection-less data transfer over BLE advertising as defined in v4.0 of the Core specification, i.e., data is broadcasted in a contention based manner over the three BLE advertising channels using an over-the-air data rate of 1 Mbps. Contention based access is an access method that is used to share a broadcast medium. In contention, any node in the network can transmit data at any time in a first come-first served way.

Later versions of the Bluetooth Mesh specification may support additional bearers. It is expected that future versions of the Bluetooth Mesh Profile would support a new connection-less bearer utilizing features from the Bluetooth 5 Core specification. In such a case, communication between Mesh relay nodes and communication from a Mesh relay node to an end node could be based on Periodic Advertising (PA), while data injected by end nodes into the Mesh could be based on LE Extended Advertising or the already existing advertising bearer. When using Periodic Advertising data is sent at fixed intervals.

When running Mesh over PA, every relay node broadcasts data at a regular interval over a frequency hopping channel. PA data transmission takes place over the BLE data channels. To receive the data that is forwarded by the respective relay nodes, other relay nodes and end nodes synchronize to the PA transmissions from one or several relay nodes. It is expected that relay nodes would synchronize to all relay nodes within range, while end nodes would synchronize to a single or just a few relay nodes within range. A PA transmission may potentially aggregate several mesh network protocol data units (PDUs), and a relay node with no new network PDU to forward would simply transmit an empty PA message or repeat the previous transmission. When not listening to the PA transmissions from other relay nodes or performing its own PA transmission, relay nodes are expected to scan the advertising channels for first-hop messages injected into the Mesh network by end nodes.

A well-known, and commonly used, technique for increasing the probability that a message is successfully delivered from source to destination is message repetition. Such message repetition may be used both between relay nodes and between an end node and a relay node, and it may be performed on an end-to-end or on a hop-by-hop basis.

FIG. 1 depicts an example of a mesh network deployment comprising 16 relay nodes. Only a single end node is depicted. The example is generated under the assumption that relay nodes are deployed at a unitary grid wherein relay nodes are separated one unit vertically and horizontally, and that two nodes are within range and have direct connectivity, if the distance is below $\sqrt{3}$ unit lengths.

Thus FIG. 1 provides a schematic example of a mesh network deployment comprising 16 relay nodes (RLs), enumerated from 0 to 15. The relay nodes forward messages such as e.g. data transmissions in the mesh network. FIG. 1 further depicts one end node marked by an unfilled circle. Such an end node may generate data, and hence inject messages in the mesh network, i.e., acting as a source node. The end node may generate and inject messages into the mesh at any time. Furthermore, end nodes may also be the destination of messages, received via any of the relay nodes to which the end node is synchronized.

The relay nodes in FIG. 1 send data over a PA bearer and it is expected that each relay node synchronizes to all other relay nodes within range. In FIG. 1, relay node connectivity is depicted using a solid line. It is assumed that the connectivity is bi-directional, i.e., RLi is synchronized to the PA transmissions of RLj, and RLj is synchronized to the PA transmissions of RLi ($i \neq j$). A relay node in the middle part of the deployment, like RL5, is hence synchronized to eight other relay nodes (0, 1, 2, 4, 6, 8, 9, 10), and the same eight relay nodes are synchronized to RL5.

FIG. 2 depicts PA transmissions and receptions as seen from RL5 in the upper plot, and RL6 in the lower plot, respectively, under the simplifying assumption that the period of the PA transmissions is same for all relay nodes and equals T. The PA transmissions are frequency hopping, and typically the different PA transmissions in FIG. 2 are transmitted and/or received over different frequency channels. The time that is not used for receiving PA transmissions from other relay nodes, or sending its own PA transmission, RL5 and RL6 use to scan the advertising channels for new messages. As seen from FIG. 2, RL5 and RL6 are often busy at the same time listening to the same PA transmission, e.g., from the relay nodes 9 and 10. Similarly, when RL5 is busy transmitting RL6 is busy receiving the PA transmission from RL5, and vice versa. Accordingly, there are time periods during which neither RL5 nor RL6 are listening to the advertising channels, and a new message injected by an end node during such a time would not be picked up by any of these two relay nodes.

The end node depicted in FIG. 1 is within range of 10 relay nodes, however, the end node may synchronize to only one or just a few of the relay nodes. Similarly, when the end node injects a new message in the mesh network, it can potentially be picked up by all the 10 relay nodes that are within range of the end node.

SUMMARY

An object of embodiments herein is to improve the performance of a mesh network.

According to a first aspect of embodiments herein, the object is achieved by a method performed by a first network node for reducing the number of colliding transmissions in a mesh network. The first network node and a second network node operate in the mesh network. The first network node and the second network node are configured to use periodic advertising for transmissions in the mesh network. The first network node calculates a first duration. The first duration relate to a transmission of data of a first size to be transmitted to the second network node. The first network node further calculates a second duration. The second duration relate to a period of time until any one out of: a reception and a transmission, of data is scheduled for second network node will occur. Based on the calculated first duration and second duration the first network node decides whether or not to decrease the first size of the transmission to a second size, so that first duration becomes shorter than the second duration. The first network then performs the transmission according to the outcome of the deciding.

According to a second aspect of embodiments herein, the object is achieved by a first network node for reducing the number of colliding transmissions in a mesh network. The first network node and a second network node are operable in the mesh network. The first network node and the second network node are configured to use periodic advertising for transmissions in the mesh network. The first network node is configured to:

calculate a first duration, which first duration relate to a transmission of data of a first size, to be transmitted to the second network node, and calculate a second duration, which second duration relate to a period of time until any one out of: a reception and a transmission, of data is scheduled for second network node will occur, based on the calculated first duration and second duration, decide whether or not to decrease the first size of the transmission to a second size, so that first duration becomes shorter than the second duration, and perform the transmission according to the outcome of the decision.

Embodiments herein avoid collisions by deciding whether or not to decrease the size of the data transmission so that the duration of transmitting the data becomes shorter and thereby it is enough time to transmit all the data before next scheduled transmission/reception to/from the second network node. Less collisions results in an improved performance of the mesh network.

An advantage of embodiments herein is that they provide . . . a means to decrease the amount of colliding transmissions; this will lead to fewer failed receptions, which, in turn, will lead to a higher capacity of the network.

BRIEF DESCRIPTION OF THE DRAWINGS

Examples of embodiments herein are described in more detail with reference to attached drawings in which:

FIGS. 12 to 15 are flowcharts illustrating methods implemented in a communication system including a host computer, a base station and a user equipment.

DETAILED DESCRIPTION

As a part of developing embodiments herein a problem will first be identified and discussed.

In a BLE mesh network, using the periodic advertising feature introduced in Bluetooth 5, a relay node typically synchronizes to all other nearby relays belonging to the same network. Since the different relay nodes typically choose their configuration independently of each other, there will be times when the transmission of two relay nodes overlap in time or time and frequency. These collisions may in turn lead to failed decoding, for the case where the time-colliding transmissions happen to occur in the same channel, or missed messages as a receiver may typically only listen to one channel at a time. Losing packets due to these collisions has a clear negative impact on the performance of the BLE mesh system as a whole as packet delivery rate is the key indicator of the performance of such a network.

Embodiments herein involves a method where a network node such as e.g. a relay node in a mesh network such as e.g. a BLE mesh network using periodic advertising adapts the length of its transmissions in order to not collide with transmissions of other network nodes such as relay nodes in the same network.

Embodiments herein will lead to a decreased number of colliding transmissions in a BLE mesh network using periodic advertising. This will in turn lead to increased overall network performance, which is mainly shown by decreased packet loss rate.

An object of embodiments herein is to improve the performance of a mesh network such as e.g. a BLE mesh network.

Figure 1:
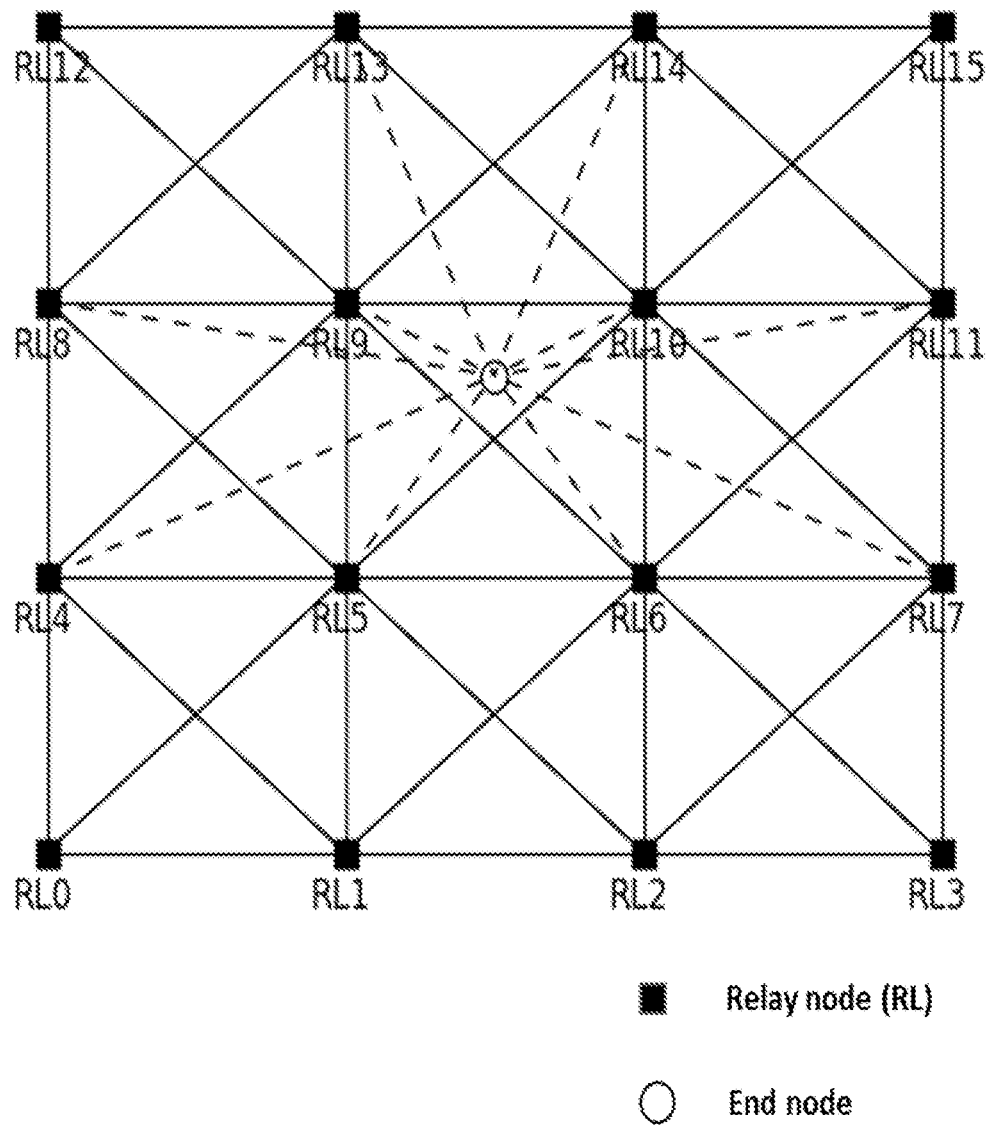
FIG. 1 is a schematic diagram illustrating a mesh network.
Figure 2:
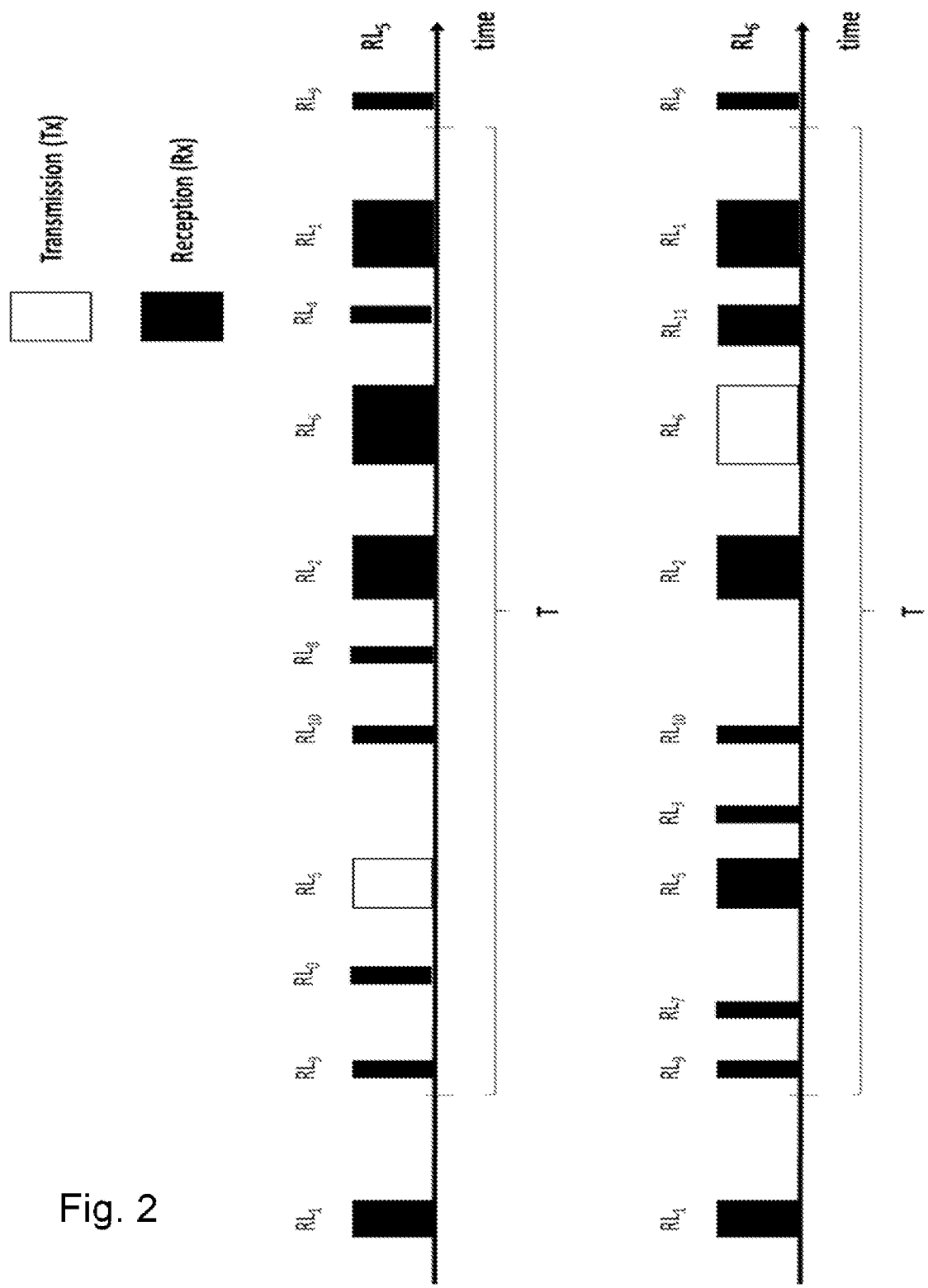
FIG. 2 is a schematic block diagram illustrating prior art.
Figure 3:
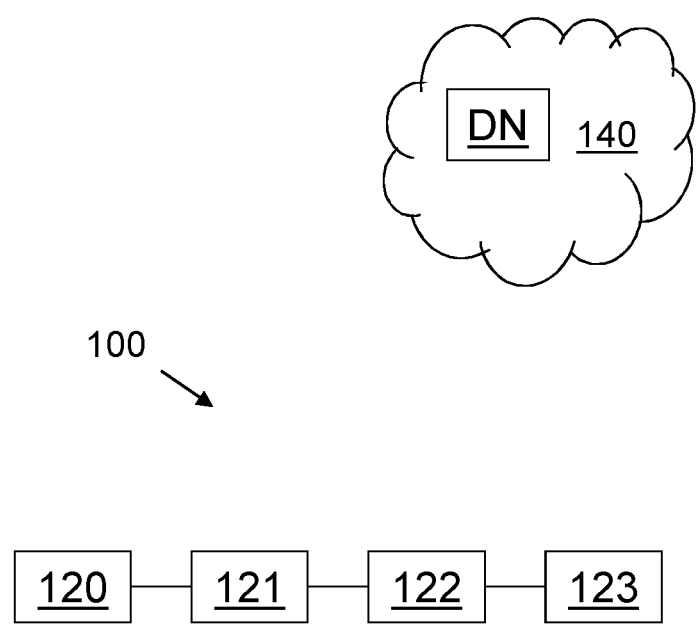
FIG. 3 is a schematic block diagram illustrating embodiments of a mesh network.

Embodiments herein relate to mesh networks in general. FIG. 3 is a schematic overview depicting a simplified schematic example of a mesh network 100 wherein embodiments herein may be implemented. The mesh network 100 may e.g. be a BLE mesh network or any other mesh network.

A number of network nodes operate in the mesh network 100 whereof only four are shown in FIG. 3, an end node 120 acting as a source node, a first network node 121, a second network node 122 and an end node 123. The first network node 121 and the second network node 122 may be relay nodes that forward messages such as e.g. data transmissions in the mesh network 100. The end network node 120 may generate data, and hence inject messages in the mesh network 100, i.e., acting as a source node. The end node 120 may generate and inject messages into the mesh network 100 at any time. Furthermore, end nodes such as the end node 123 may also be the destination of messages, received via any of the relay nodes such as the network nodes 121, 122 to which the end node such as the end node 123 is synchronized.

The end nodes 120, 123, the first network node 121, and the second network node 122 provide radio coverage also referred to as range or radio range over a geographical area and they may communicate with other network nodes within range.

The relay nodes such as the network nodes 121, 122 in FIG. 3 send data over a PA bearer and it is expected that each relay node synchronizes to all other relay nodes within range. It may be assumed that the connectivity is bi-directional. The first network node 121 also referred to as relay node A in examples below, is hence synchronized to other relay nodes in range such as the second network node 122, and the same relay nodes are synchronized to the first network node 121. The end node 120 depicted in FIG. 3 is within range of relay nodes such as at least the first network node 121, however, the end node 120 may synchronize to only one or just a few of the relay nodes. Similarly, when the end node 120 injects a new message in the mesh network 100, it may potentially be picked up by all the relay nodes that are within range such as radio range of the end node.

PA transmissions and receptions from the first network node 121 and the second network node 122 respectively are in the examples below performed under the simplifying assumption that the period of the PA transmissions is same for all relay nodes Note that that this assumption only relates to the explanatory figure, and not to how apply the embodiments to a mesh network using PA in general. The PA transmissions may be frequency hopping, and typically the different PA transmissions may be transmitted and/or received over different frequency channels.

Network nodes such as the first network node 121, the second network node 122 and any relay node, are typically synchronized to the transmissions of all other nearby network nodes such as relay relays. This will be used by the first the first network node 121 to calculate if a collision will occur prior to performing a transmission. This allows the first network node 121 to adapt its transmission behaviour in order to avoid colliding, when possible.

Actions of Some Embodiments Herein

Figure 4:
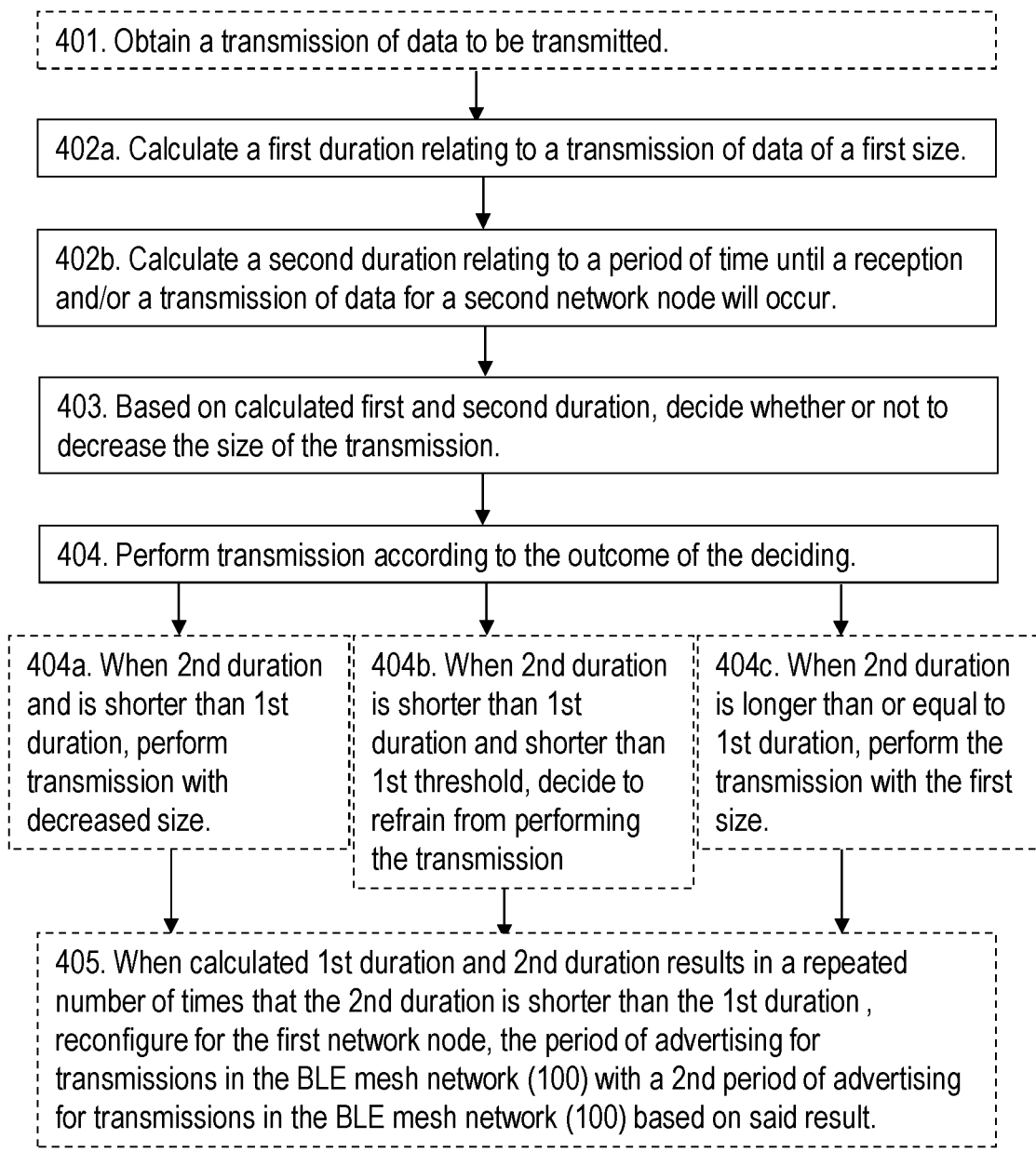
FIG. 4 is a flowchart depicting embodiments of a method in a first network node.

Example embodiments of a flowchart depicting embodiments of a method performed by the first network node 121, such as e.g. a relay node, for reducing the number of colliding transmissions in a mesh network 100, such as e.g. a Bluetooth Low Energy, BLE mesh network, are depicted in FIG. 4. The first network node 121 and the second network node 122 may be configured to use periodic advertising for transmissions in the BLE mesh network 100. The first network node 121 may preferably be synchronized with the second node 122.

The method may comprise one or more of the following actions which actions may be taken in any suitable order.

Action 401.

In an example scenario the end node 120 is acting as a source node and injects a new message such as a transmission of data, also referred to a data transmission, in the mesh network 100. The transmission of data is picked up by all the relay nodes that are within radio range of the end node 120. In this example scenario the within radio range of the end node 120 and thus the first network node 121 may obtain a transmission of data that is to be transmitted further via the second network node 122 to the end node 123.

Action 402 a.

The first network node 121 thus has data of a specific first size to transmit to the second network node. To be able to adapt the size of the data transmissions in order to avoid collisions, the first network node 121 need to compare the a first duration of the data transmission of the specific first size, i.e. how long time it takes too transmit the data of the first size, with a second duration which is a time period from starting the first size data transmission until a reception or a transmission of data is scheduled for the second network node 122 will occur. Thus the first network node 121 calculates the first duration. The first duration relate to the transmission of data of the first size, to be transmitted to the second network node 122. This may mean that first duration corresponds to the time it takes for the transmission of data of the first size to be transmitted from the first network node 121 to the second network node 122.

Action 402 b.

The first network node further calculates a second duration. The second duration relate to a period of time until any one out of: a reception and a transmission, of data is scheduled for the second network node 122 will occur. This may mean that second duration corresponds to the time it takes from starting to transmit the first size data in the first network node 121 until a reception or a transmission of data is scheduled from or to the second network node 122 will occur.

That scheduled reception of data the second network node 122 will occur is known by the first network node 121 since . . . it is synchronized to the periodic transmissions of the second node.

Action 403.

The question is then whether there is enough time to transmit the data to the second network node 122 to not collide with the next scheduled reception or transmission for the second network node 122. In other words, whether there is enough time to transmit the data to the second network node 122 before the next scheduled reception or transmission for the second network node 122 occurs. If there is not enough time, the size of the data transmission will be decided to be decreased. Therefore, based on the calculated first duration and second duration the first network node 121 decides whether or not to decrease the first size of the transmission to a second size so that first duration becomes shorter than the second duration.

The wording "decreasing the transmission" when used herein, may in some embodiments relate to decreasing the amount of higher layer packets aggregated in a single transmission.

Action 404.

The first network node 121 performs the transmission according to the outcome of the deciding in action 403. How to decide according to some different example scenarios in Actions 404 a, b and c will be described below.

Action 404a. According to a first example scenario, the performing of the transmission according to the outcome of the deciding 403 may comprise: When the second duration is shorter than the first duration, decreasing the first size of the transmission to a second size, so that first duration becomes shorter than the second duration, and performing the transmission with the second size.

According to a similar example, the performing of the transmission according to the outcome of the deciding 403 may comprise: When the second duration and a further predetermined time period together are shorter than the first duration, decreasing the first size of the transmission to a second size, so that first duration becomes shorter than the second duration, and performing the transmission with the second size. It is advantageous for the first network node 121 that according to some embodiments choose to include some extra time overhead, also referred to as a further predetermined time period, to e.g. account for channel switching time, or time to switch between transmitting and receiving, in order to ensure that a third node has the possibility to receive both transmissions as well as to ensure that the second network node 122 can receive the transmission of the first network node 121 and vice versa.

The second duration being shorter than the first duration may be an indication that the transmission of data of the first size will collide in time with any one out of: the reception and the transmission, of data scheduled for second network node 122 if the transmission with the first size would be transmitted.

Action 404b. According to a second example scenario, the performing of the transmission according to the outcome of the deciding 403 may comprise: When the second duration is shorter than the first duration and shorter than a first threshold, deciding to refrain from performing the transmission. As mentioned above, the second duration being shorter than the first duration may be an indication that the transmission of data of the first size will collide in time with any one out of: the reception and the transmission, of data scheduled for second network node 122 if the transmission with the first size would be transmitted.

Action 404c. According to a third example scenario, the performing of the transmission according to the outcome of the deciding 403 may comprise: When the second duration is longer than or equal to the first duration, performing 404c the transmission with the first size.

Action 405.

In an example scenario where the first network node 121 detects recurring collisions with another node, i.e. the size of the time period is the same, very close to the same or a multiple of its own period, the first network node 121 may reconfigure its own PA with a new period that does not cause recurring collisions with other nodes to which it is already synchronized.

Thus, in some embodiments, when calculating 402a the first duration and calculating 402b the second duration results in a repeated number of times more than a threshold that the second duration is shorter than the first duration, the first network node 121 may reconfigure for the first network node 121, the period of advertising for transmissions in the BLE mesh network 100 with a second period of advertising for transmissions in the BLE mesh network 100 based on said result.

Transmissions may only be adapted to not collide with other transmissions that are scheduled to start after the start of the own transmission. Hence, it may only be the node whose transmission starts first that will perform any adaptation of the transmission length.

Figure 5:
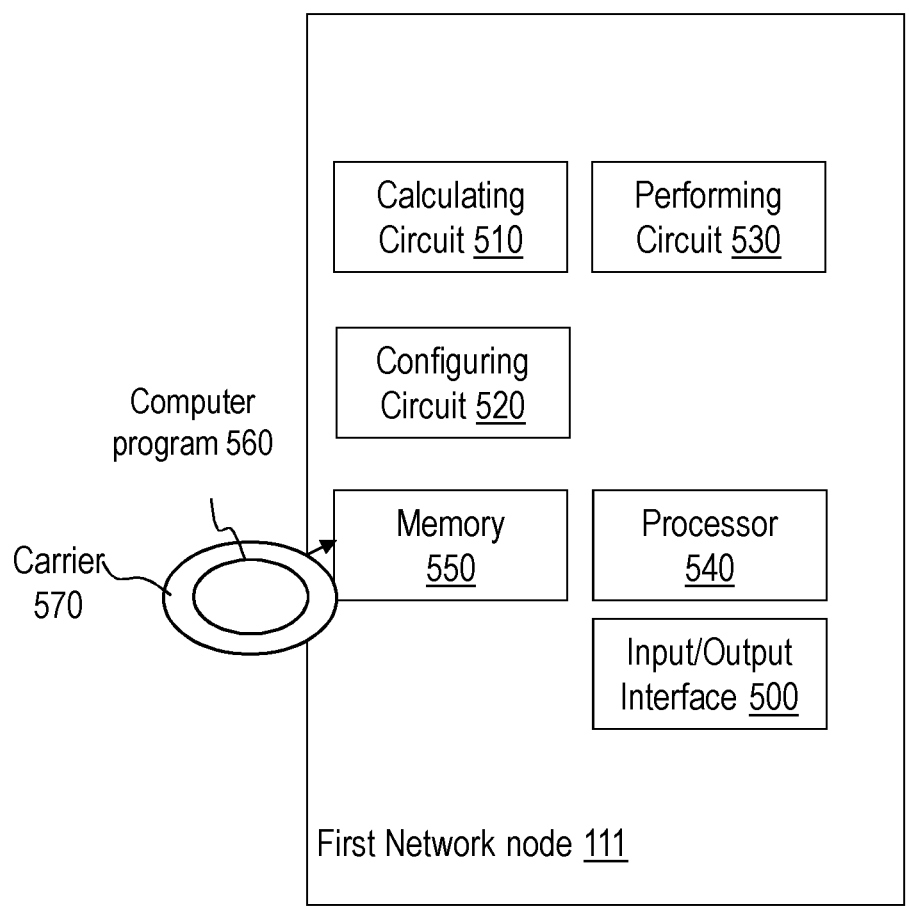
FIG. 5 is a schematic block diagram illustrating embodiments herein.

To perform the method actions e.g. for planning radio resources for transmissions, the first network node 121 may comprise the arrangement depicted in FIG. 5. The first network node 121 may e.g. comprise a calculating circuit 510, a configuring circuit 520 and a performing circuit 530. These will be described more below.

To perform the method actions e.g. for planning radio resources for transmissions, the first network node 121 may in some embodiments e.g. comprise a calculating module, a configuring module and a performing module.

Those skilled in the art will also appreciate that the modules and circuits in the first network node 121 described above may refer to a combination of analog and digital circuits, and/or one or more processors configured with software and/or firmware, e.g. stored in the first network node 121, that when executed by the respective one or more processors such as the processors described above performing the method actions herein. One or more of these processors, as well as the other digital hardware, may be included in a single Application-Specific Integrated Circuitry ASIC), or several processors and various digital hardware may be distributed among several separate components, whether individually packaged or assembled into a system-on-a-chip SoC).

The first network node 121 may comprise an input and output interface 500 configured to communicate with the second network node 122. The input and output interface may comprise a wireless receiver not shown) and a wireless transmitter not shown).

The embodiments herein may be implemented through a respective processor or one or more processors, such as the processor 540 of a processing circuitry in the first network node 121 depicted in FIG. 5, together with respective computer program code for performing the functions and actions of the embodiments herein. The program code mentioned above may also be provided as a computer program product, for instance in the form of a data carrier carrying computer program code for performing the embodiments herein when being loaded into the first network node 121. One such carrier may be in the form of a CD ROM disc. It is however feasible with other data carriers such as a memory stick. The computer program code may furthermore be provided as pure program code on a server and downloaded to the first network node 121.

The network node 120, 130 may further comprise a memory 550 comprising one or more memory units. The memory 550 comprises instructions executable by the processor 540 in first network node 121.

The memory 550 is arranged to be used to store e.g. first durations, second durations, calculations, data, configurations, and applications to perform the methods herein when being executed in the first network node 121.

In some embodiments, a respective computer program 560 comprises instructions, which when executed by the respective at least one processor 540, cause the at least one processor 540 of the first network node 121 to perform the actions above.

In some embodiments, a respective carrier 570 comprises the respective computer program, wherein the carrier is one of an electronic signal, an optical signal, an electromagnetic signal, a magnetic signal, an electric signal, a radio signal, a microwave signal, or a computer-readable storage medium.

Embodiments herein such as mentioned above will now be further described and exemplified. The text below is applicable to and may be combined with any suitable embodiment described above.

As mentioned above, Network nodes such as the first network node 121, the second network node 122 and any relay node, are typically synchronized to the transmissions of all other nearby network nodes such as relay relays. This means the first network node 121 know when a next transmission is scheduled from the first network node 121 to the second network node 122 and/or reception to the first network node 121 from the second network node 122. This will be used by the first the first network node 121 to calculate prior to performing a transmission, if a collision will occur. A collision will occur if there is not enough time to transmit all the data before the next transmission/reception is scheduled, then the data transmission will collide with next scheduled transmission/reception to/from the second network node 122. This allows the first network node 121 to adapt its behaviour, i.e. to adapt the size of the data that is to be sent to the second network node 122, in order to avoid colliding, when possible. Different network nodes, such as the first network node 121 and any relay nodes, may use individual configurations and collisions may only occur occasionally. Therefore, decisions on how to handle collisions may be handled on a per transmission basis in some embodiments. That is how to avoid collisions by deciding whether or not to decrease the size of the data transmission so that the duration of transmitting the data becomes shorter and it thereby is enough time to transmit all the data before next scheduled transmission/reception to/from the second network node 122. Consider in the following examples two relay nodes, the first network node 121 being a relay node A and the second network node 122 being a relay node B, which are both synchronized to each other. In a case where relay node A has data to transmit and has adapted the size of its data transmission according to embodiments herein, a collision will no longer lead to relay node B being unable to receive the transmission from relay node A, and neither lead to that relay node A will be missing any possible data from relay node B.

Figure 6:
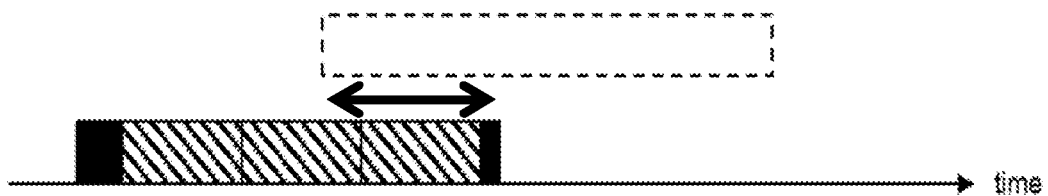
FIG. 6 is a schematic block diagram illustrating embodiments herein.
Figure 6:
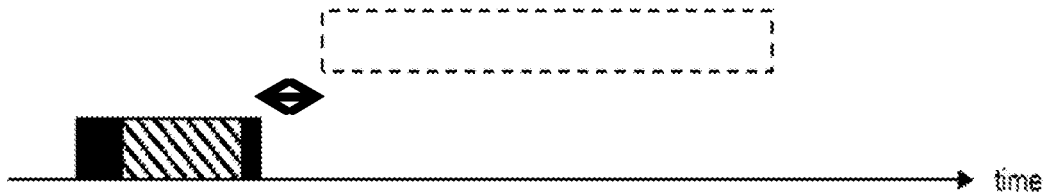

By letting the network nodes such as the first network node 121 adapt its transmissions according to embodiments herein, many collisions may be avoided. Exploiting the fact that the data to be transmitted, also referred to herein as a data transmission, is not a single payload packet, but rather an aggregate of a number of mesh packets, also referred to as mesh data packets, the first network node 121 may according to embodiments herein be able to adapt the length of its transmissions by selecting the number of packets to be included in the aggregated transmission as illustrated in FIG. 6. The assumption "Exploiting the fact that the data to be transmitted is not a single payload packet, but rather an aggregate of a number of mesh packets" is based on the current discussions within the Bluetooth SIG about how to use PA as a bearer for mesh.

E.g. decrease the first size of the transmission to a second size which is smaller than the first size. FIG. 6 depicts an example of an adapted transmission in the first network node 121 to avoid collisions with another relay node such as the second network node 122. In this example, the number of payload packets is decreased by two in the resulting transmission.

The first size data transmission comprising overhead represented by black boxes and payload represented by three diagonal striped boxes, together having a first size, and the scheduled data transmission/reception is represented by a dashed box. These transmissions are presented along a time axis under Planned transmission.

Because there is a risk of collision during the time period marked by the double targeted arrow under planned transmission in the figure, the first network node 121 decreases the first size with two payload boxes, to a second size comprising the overhead boxes and only one payload box.

The second size data transmission comprising overhead represented by black boxes and payload represented by one diagonal striped boxes, and the scheduled data transmission/reception is represented by a dashed box. These transmissions are presented along a time axis under Adapted transmission.

Now it can be seen that when the data decreased to the second size has been transmitted, there is also a little time over represented by the double targeted arrow under adapted transmission in the figure, until the scheduled transmission/reception, so the risk of collision has been avoided.

When calculating if two transmissions do collide in time, the first network node 121 may in some embodiments choose to include e.g. in the first duration some extra time overhead, also referred to as a further predetermined time period. This is to e.g. account for channel switching time, or time to switch between transmitting and receiving, in order to ensure that a third node has the possibility to receive both transmissions as well as to ensure that the second network node 122 such as relay node B can receive the transmission from the first network node 121 such as relay node A and vice versa.

Figure 7:
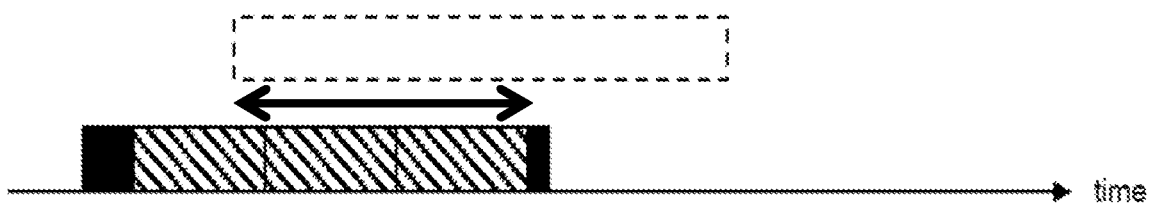
FIG. 7 is a schematic block diagram illustrating embodiments herein.
Figure 7:

For a case where a collision covers such a large portion of the planned transmission that no payload may fit in a non-colliding transmission, the first network node 121 may also choose to transmit an empty packet, containing no payload at all. In this way the data transmission comprising the empty packet may still serve as a keep-alive message, preventing synchronized network nodes such as the second network node 122 to drop synchronization due to not receiving anything. In this embodiment, the first size of the transmission is decreased so the to a second size becomes zero, and the transmission is performed with the second size, FIG. 7 illustrates how the adapted transmission may look when no payload is included. FIG. 7 is thus an example of an adapted transmission where all payload packets have been deferred to a later transmission opportunity in order to avoid a collision.

The first size data transmission comprising overhead represented by black boxes and payload represented by three diagonal striped boxes, together having a first size, and the scheduled data transmission/reception is represented by a dashed box. These transmissions are presented along a time axis under Planned transmission.

Because there is a risk of collision during the time period marked by the double targeted arrow under planned transmission in the figure, the first network node 121 decreases the first size with all three payload boxes, to a second size comprising the overhead boxes only.

The second size data transmission comprising only overhead is represented by a black box, and the scheduled data transmission/reception is represented by a dashed box. These transmissions are presented along a time axis under Adapted transmission.

Here it can be seen that when the data decreased to the second size has been transmitted, there is also a little time over represented by the double targeted arrow under adapted transmission in the figure, until the scheduled transmission/reception, so the risk of collision has been avoided.

Figure 8:
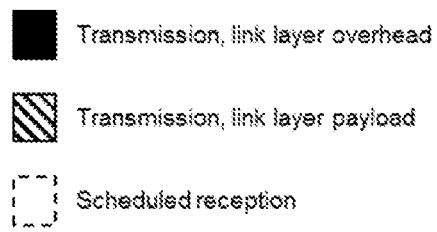
FIG. 8 is a schematic block diagram illustrating embodiments herein.
Figure 8:
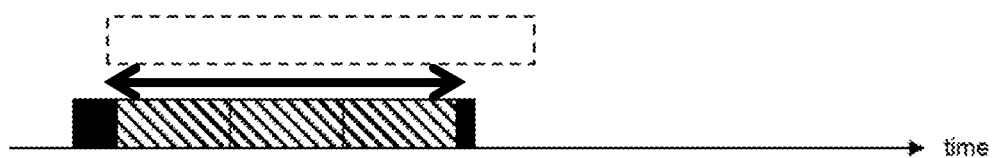
Figure 8:
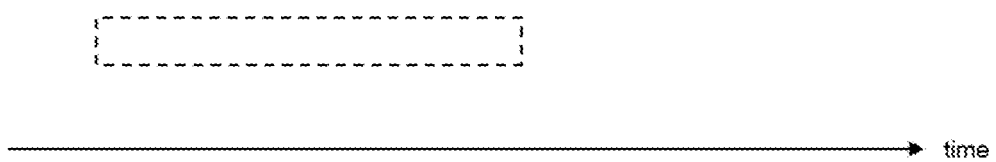

If not, even the empty packet can be transmitted without collisions, the network node 121 may choose to defer, also referred to as refrain from or cancel, the transmission completely and not transmit until the next transmission opportunity. This is illustrated in FIG. 8. FIG. 8 depicts an example of a transmission that is completely cancelled in order to avoid a collision.

The first size data transmission comprising overhead represented by black boxes and payload represented by three diagonal striped boxes, together having a first size, and the scheduled data transmission/reception is represented by a dashed box. These transmissions are presented along a time axis under Planned transmission.

Because there is a risk of collision during the time period marked by the double targeted arrow under planned transmission in the figure, the first network node 121 decides to not decrease the size but to defer the transmitting of the data to a later occasion.

The scheduled data transmission/reception is represented by a dashed box, but there is no second size data transmission since it is deferred. This scheduled transmission/reception is presented along a time axis under Adapted transmission.

Here it can be seen that when no data is transmitted, there is enough time for the scheduled transmission/reception, so the risk of collision has been avoided.

Figure 9:
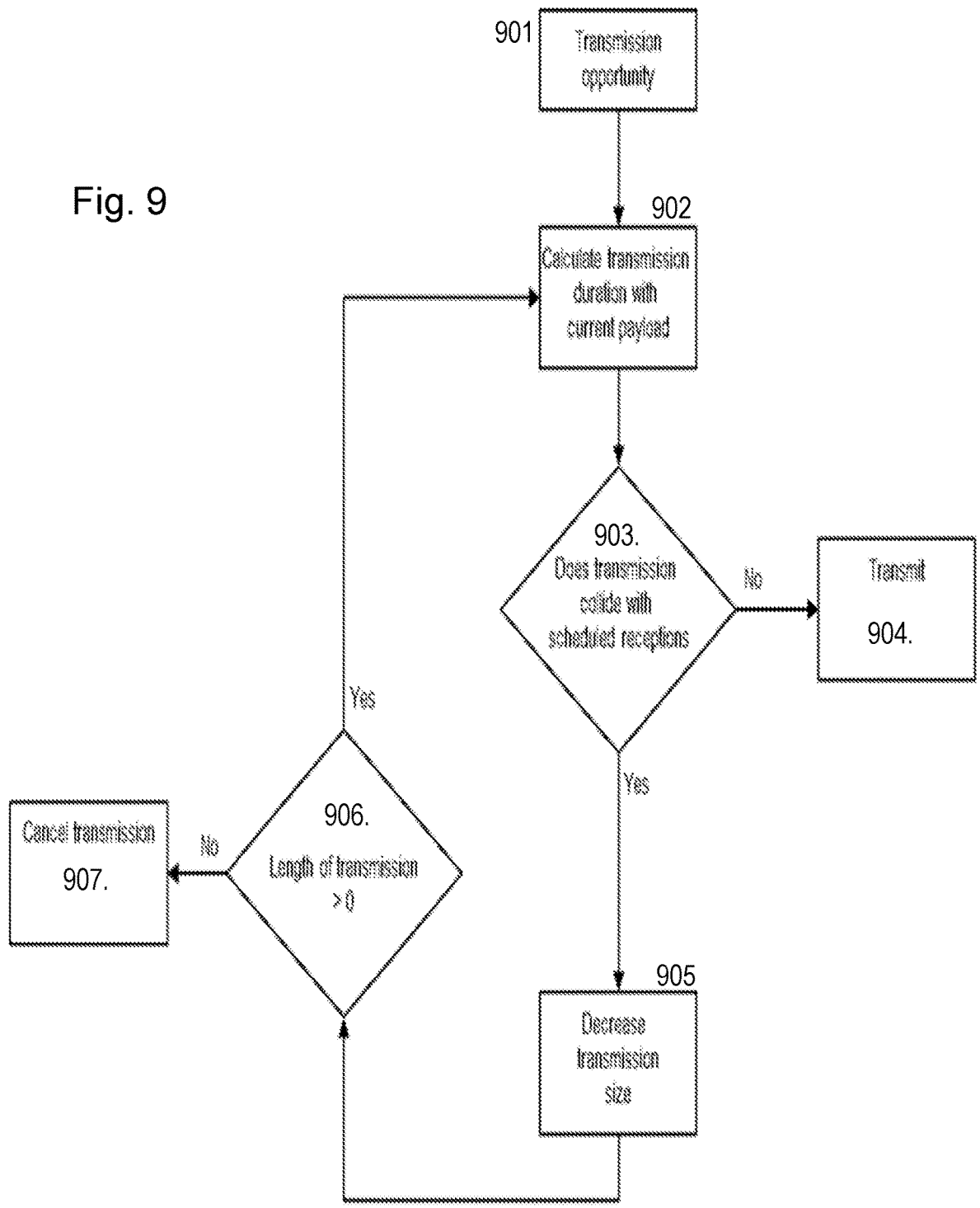
FIG. 9 is a flowchart illustrating embodiments herein.

An example flow of adapting the length also referred to as size, of the transmissions is illustrated in the flowchart in FIG. 9. FIG. 9 depicts a flowchart showing an example of how the length also referred to as size of a transmission may be adapted to avoid collisions.

Action 901. The first network node 121 has received a data transmission of a first size and therefore has a transmission opportunity for transmitting the first size data transmission to the second network node 122.

Action 902. The first network node 121 calculates the first duration of the first size data transmission.

Action 903. The first network node 121 further calculates the second duration, i.e. the time until a next transmission/ reception is scheduled for the second network node. The first network node then checks if the first size data transmission collides with the next scheduled transmission/reception by comparing the first and second durations.

Action 904. If there is no risk of collision, i.e. the second duration is longer than the first duration, the first network node 121 transmits the first size data to the second network node, i.e. no decreasing of the first size data is needed.

Action 905. If there is a risk of collision, i.e. the second duration is shorter than the first duration, the first network node 121 decreases the first size data to become a second size data, i.e. a decreasing of the first size data is needed.

Action 906. If there is data left after decreasing the first size data to the second size data, the first network node 121 transmits the second size data to the second network node 122. I.e. the length of the second size data is above zero or repeats Action 902.

Action 907. If there is no data left after decreasing the first size data to the second size data, the first network node 121 cancels the data transmission or defers the data transmission. I.e. the length of the second size data is equal to zero.

Assuming that all network nodes such relay nodes within the mesh network 100 are using the method of adapting transmissions according to embodiments herein, a relay node such as the first network node 121 will never need to consider collisions with transmissions that start prior to the own planned transmission. For instance, node A may not need to consider a collision with a transmission from node B, if the transmission from B starts prior to the starting time of A's transmission. This is due to the facts that B's transmission should already be adapted the transmission of A.

A third node, C, also referred to as a third network node 124 that is synchronized to both this first network node such as node A and the second network node such as node B, may also assume that nodes A and B adapt to each other as described above. In the example scenario where the overlap is too large to accommodate any data in the first transmission, as in FIG. 7, the node C may only consider the last of the colliding transmissions. In the example scenario where the overlap is smaller, as in FIG. 6, the node C may attempt to receive both messages.

In an example scenario where the first network node 121 detects recurring collisions with another node, i.e. the period is the same, very close to the same or a multiple of its own period, the first network node 121 may reconfigure its own PA with a new period that does not cause recurring collisions with other nodes to which it is already synchronized.

Some example Embodiments numbered 1-18 are described below.

The following embodiments refer among other things to FIG. 3, FIG. 4, and FIG. 5.

Embodiment 1

A method performed by a first network node 121 such as e.g. a relay node, for reducing the number of colliding transmissions in a mesh network 100 such as e.g. a Bluetooth Low Energy, BLE mesh network, wherein the first network node 121 and a second network node 122 operate in the BLE mesh network 100, and wherein the first network node 121 and the second network node 122 are configured to use periodic advertising for transmissions in the BLE mesh network 100, the method comprising:
calculating 402a, a first duration, which first duration relate to a transmission of data of a first size, to be transmitted to the second network node 122, and calculating 402b a second duration, which second duration relate to a period of time until any one out of: a reception and a transmission, of data is scheduled for second network node 122 will occur,
based on the calculated first duration and second duration deciding 403 whether or not to decrease the first size of the transmission to a second size, so that first duration becomes shorter than the second duration, and
performing 404 the transmission according to the outcome of the deciding 403.

Embodiment 2

The method according to Embodiment 1, wherein performing 404 the transmission according to the outcome of the deciding 403 comprises:
when the second duration is shorter than the first duration, decreasing 404a the first size of the transmission to a second size, so that first duration becomes shorter than the second duration, and performing the transmission with the second size.

Embodiment 3

The method according to Embodiment 1, wherein performing 404 the transmission according to the outcome of the deciding 403 comprises:
when the second duration and a further predetermined time period together are shorter than the first duration, decreasing 404a the first size of the transmission to a second size, so that first duration becomes shorter than the second duration, and performing the transmission with the second size.

Embodiment 4

The method according to Embodiment 1, wherein performing 404 the transmission according to the outcome of the deciding 403 comprises:
when the second duration is shorter than the first duration and shorter than a first threshold, deciding 404b to refrain from performing the transmission.

Embodiment 5

The method according to Embodiment 1, wherein performing 404 the transmission according to the outcome of the deciding 403 comprises any one out of:
when the second duration is longer than or equal to the first duration, performing 404c the transmission with the first size.

Embodiment 6

The method according to any of the Embodiments 1-3, wherein the second duration being shorter than the first duration is an indication that the transmission of data of the first size will collide in time with any one out of: the reception and the transmission, of data scheduled for second network node 122 if the transmission with the first size would be transmitted.

Embodiment 7

The method according to any of the Embodiments 1-6, further comprising:

when calculating 402a the first duration and calculating 402b the second duration results in a repeated number of times more than a threshold that the second duration is shorter than the first duration, reconfiguring 405 for the first network node 121, the period of advertising for transmissions in the BLE mesh network 100 with a second period of advertising for transmissions in the BLE mesh network 100 based on said result.

Embodiment 8

The method according to any of the Embodiments 1-7, wherein the first network node 121 is synchronized with the second node 122.

Embodiment 9

A computer program comprising instructions, which when executed by a processor, causes the processor to perform actions according to any of the Embodiments 1-8.

Embodiment 10

A carrier comprising the computer program of Embodiments 9, wherein the carrier is one of an electronic signal, an optical signal, an electromagnetic signal, a magnetic signal, an electric signal, a radio signal, a microwave signal, or a computer-readable storage medium.

Embodiment 11

Embodiment, first network node 121 such as e.g. a relay node, for reducing the number of colliding transmissions in a mesh network 100 such as e.g. a Bluetooth Low Energy, BLE mesh network, wherein the first network node 121 and a second network node 122 are operable in the BLE mesh network 100, and wherein the first network node 121 and the second network node 122 are configured to use periodic advertising for transmissions in the BLE mesh network 100, the first network node 121 being configured to:
calculate, a first duration, which first duration relate to a transmission of data of a first size, to be transmitted to the second network node 122, and calculate a second duration, which second duration relate to a period of time until any one out of: a reception and a transmission, of data is scheduled for second network node 122 will occur, e.g. by means of a calculating circuit 510,
based on the calculated first duration and second duration, decide whether or not to decrease the first size of the transmission to a second size, so that first duration becomes shorter than the second duration, e.g. by means of the processor 540 and
perform the transmission according to the outcome of the decision, e.g. by means of a performing circuit 530.

Embodiment 12

The first network node 121 according to Embodiment 11, wherein the first network node 121 is configured to, e.g. by means of the performing circuit 530 configured to perform the transmission according to the outcome of the decision by:
when the second duration is shorter than the first duration, decrease the first size of the transmission to a second size, so that first duration becomes shorter than the second duration, and perform the transmission with the second size.

Embodiment 13

The first network node 121 according to Embodiment 11, wherein the first network node 121 is configured to e.g. by means of the performing circuit 530 configured to perform the transmission according to the outcome of the decision by:
when the second duration and a further predetermined time period together are shorter than the first duration, decrease the first size of the transmission to a second size, so that first duration becomes shorter than the second duration, and perform the transmission with the second size.

Embodiment 14

The first network node 121 according to Embodiment 11, wherein the first network node 121 is configured to e.g. by means of the performing circuit 530 configured to perform the transmission according to the outcome of the decision by:
when the second duration is shorter than the first duration and shorter than a first threshold, decide to refrain from performing the transmission.

Embodiment 15

The first network node 121 according to Embodiment 11, wherein the first network node 121 is configured to e.g. by means of the performing circuit 530 configured to perform the transmission according to the outcome of the decision by:
when the second duration is longer than or equal to the first duration, perform the transmission with the first size.

Embodiment 16

The first network node 121 according to any of the Embodiments 11-13, wherein the second duration being shorter than the first duration is adapted to be an indication that the transmission of data of the first size will collide in time with any one out of: the reception and the transmission, of data scheduled for second network node 122 if the transmission with the first size would be transmitted.

Embodiment 17

The first network node 121 according to any of the Embodiment 16, wherein the first network node 121 further is configured to e.g. by means of the configuring circuit 520 configured to:
when the calculation of the first duration and the calculation of the second duration results in a repeated number of times more than a threshold that the second duration is shorter than the first duration, reconfigure for the first network node 121, the period of advertising for transmissions in the BLE mesh network 100 with a second period of advertising for transmissions in the BLE mesh network 100 based on said result.

Embodiment 18

The first network node 121 according to any of the Embodiments 11-17, wherein the first network node 121 is configured to be synchronized with the second node 122.

Further Extensions and Variations

Figure 10:
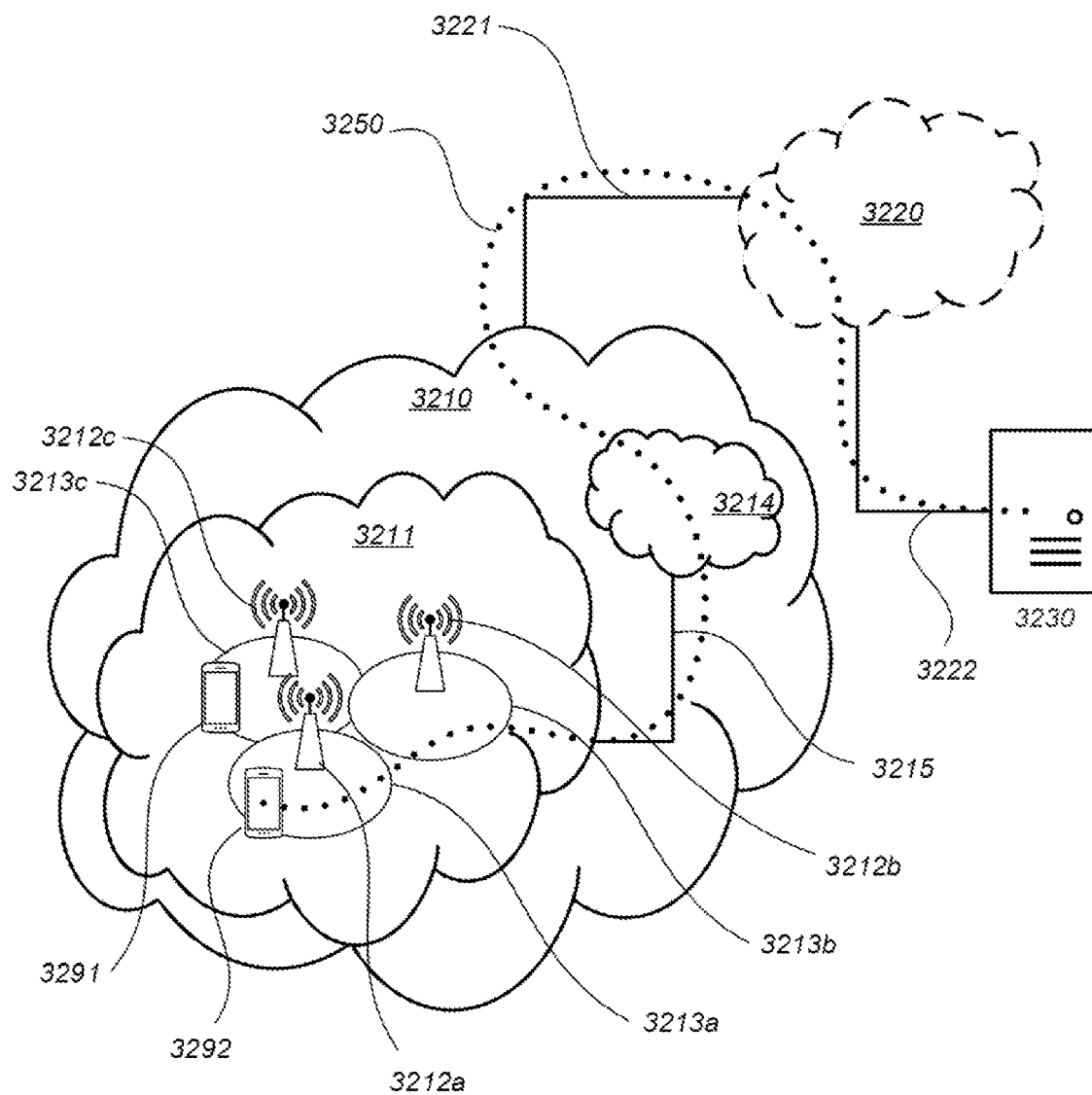
FIG. 10 schematically illustrates a telecommunication network connected via an intermediate network to a host computer.

With reference to FIG. 10, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 121, 122, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the network node 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
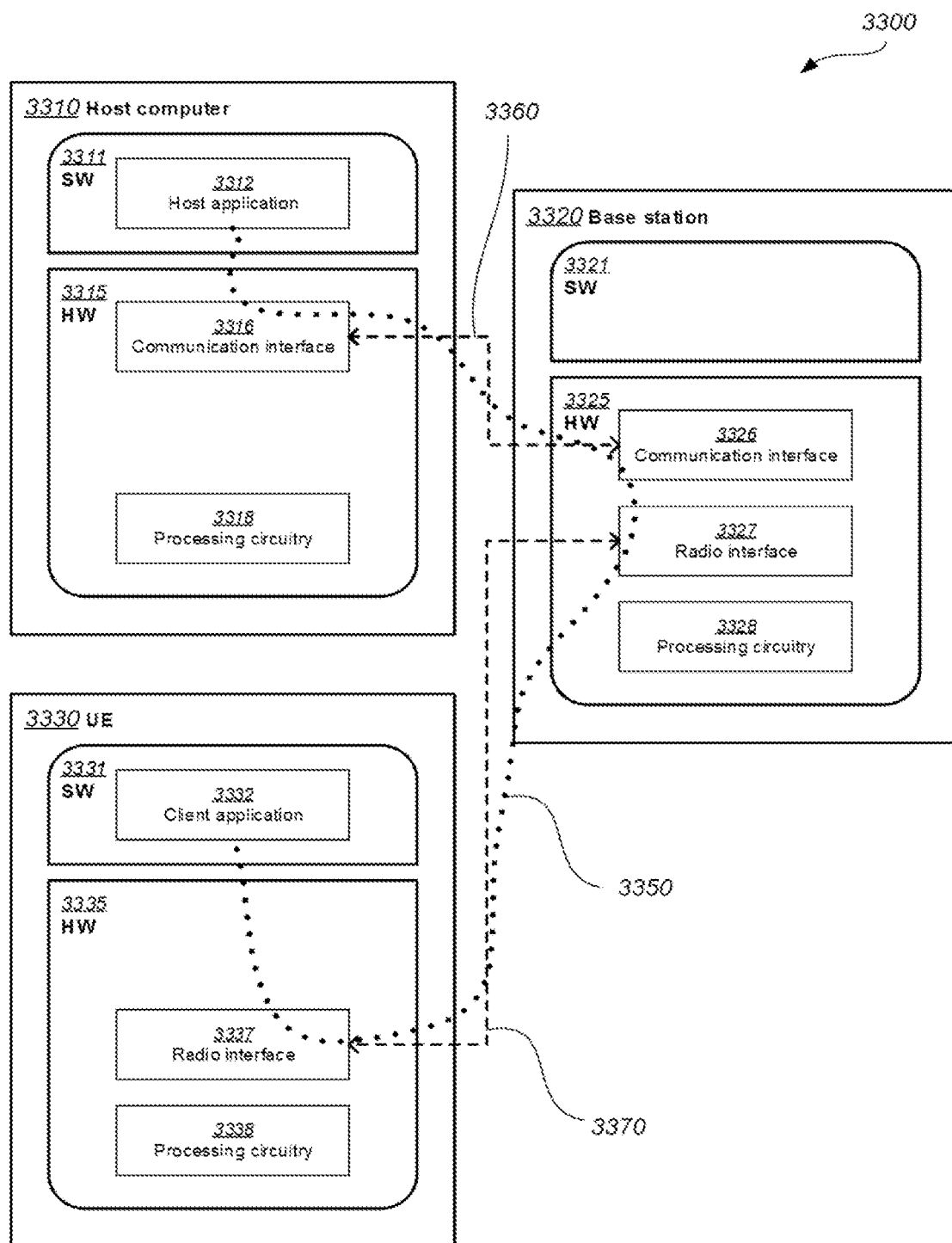
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 12 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 13 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 14 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 15 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a first network node, for reducing the number of colliding transmissions in a mesh network, wherein the first network node and a second network node operate in the mesh network, and wherein the first network node and the second network node are configured to use periodic advertising for transmissions in the mesh network, the method comprising:
    calculating, a first duration, wherein the first duration relates to a transmission of data of a first size, to be transmitted to the second network node;
    calculating a second duration, wherein the second duration relates to a period of time until a reception or transmission of data scheduled for the second network node will occur;
    based on the first duration and the second duration, deciding whether or not to decrease the first size of the transmission to a second size, so that the first duration becomes shorter than the second duration; and
    performing the transmission according to the outcome of the deciding.

2. The method according to claim 1, wherein performing the transmission according to the outcome of the deciding comprises:
    when the second duration is shorter than the first duration, decreasing the first size of the transmission to the second size, so that the first duration becomes shorter than the second duration, and performing the transmission with the second size.

3. The method according to claim 1, wherein performing the transmission according to the outcome of the deciding comprises:
    when the second duration and a further predetermined time period together are shorter than the first duration, decreasing the first size of the transmission to the second size, so that the first duration becomes shorter than the second duration, and performing the transmission with the second size.

4. The method according to claim 1, wherein performing the transmission according to the outcome of the deciding comprises:
    when the second duration is shorter than the first duration and shorter than a first threshold, deciding to refrain from performing the transmission.

5. The method according to claim 1, wherein performing the transmission according to the outcome of the deciding comprises:
    when the second duration is longer than or equal to the first duration, performing the transmission with the first size.

6. The method according to claim 1, wherein the second duration being shorter than the first duration is an indication that the transmission of data of the first size will collide in time with the reception or transmission of data scheduled for the second network node if the transmission with the first size would be transmitted.

7. The method according to claim 1, further comprising:
    when calculating the first duration and calculating the second duration results in a repeated number of times more than a threshold that the second duration is shorter than the first duration, reconfiguring for the first network node, a first period of advertising for transmissions in the mesh network with a second period of advertising for transmissions in the mesh network based on the result.

8. The method according to claim 1, wherein the first network node is synchronized with the second network node.

9. A non-transitory computer readable medium storing a computer program for reducing the number of colliding transmissions in a mesh network, wherein a first network node and a second network node operate in the mesh network, and wherein the first network node and the second network node are configured to use periodic advertising for transmissions in the mesh network, wherein the computer program comprises instructions that, when executed by a processor of the first network node, cause the processor to:
    calculate, a first duration, wherein the first duration relates to a transmission of data of a first size, to be transmitted to the second network node;
    calculate a second duration, wherein the second duration relates to a period of time until a reception or transmission of data scheduled for the second network node will occur;
    based on the first duration and the second duration, decide whether or not to decrease the first size of the transmission to a second size, so that the first duration becomes shorter than the second duration; and
    perform the transmission according to the outcome of the decision.

10. A first network node configured for reducing the number of colliding transmissions in a mesh network, wherein the first network node and a second network node are operable in the mesh network, and wherein the first network node and the second network node are configured to use periodic advertising for transmissions in the mesh network, the first network node comprising:
    communication circuitry configured for communicating with one or more nodes in the mesh network; and
    processing circuitry operatively associated with the communication circuitry and configured to:
        calculate, a first duration, wherein the first duration relates to a transmission of data of a first size, to be transmitted to the second network node;
        calculate a second duration, wherein the second duration relates to a period of time until a reception or transmission of data scheduled for the second network node will occur;
        based on the first duration and the second duration, decide whether to decrease the first size of the transmission to a second size, so that the first duration becomes shorter than the second duration; and
        perform the transmission, via the communication circuitry, according to the outcome of the decision.

11. The first network node according to claim 10, wherein the processing circuitry is configured to perform the transmission according to the outcome of the decision by:
    when the second duration is shorter than the first duration, decreasing the first size of the transmission to the second size, so that the first duration becomes shorter than the second duration, and performing the transmission with the second size.

12. The first network node according to claim 10, wherein the processing circuitry is configured to perform the transmission according to the outcome of the decision by:
when the second duration and a further predetermined time period together are shorter than the first duration, decreasing the first size of the transmission to the second size, so that first duration becomes shorter than the second duration, and performing the transmission with the second size.

13. The first network node according to claim 10, wherein the processing circuitry is configured to perform the transmission according to the outcome of the decision by:
when the second duration is shorter than the first duration and shorter than a first threshold, deciding to refrain from performing the transmission.

14. The first network node according to claim 10, wherein the processing circuitry is configured to perform the transmission according to the outcome of the decision by:
when the second duration is longer than or equal to the first duration, performing the transmission with the first size.

15. The first network node according to claim 10, wherein the second duration being shorter than the first duration is an indication that the transmission of data of the first size will collide in time with the reception or transmission of data scheduled for the second network node if the transmission with the first size would be transmitted.

16. The first network node according to claim 15, wherein the processing circuitry is configured to:
when the calculation of the first duration and the calculation of the second duration results in a repeated number of times more than a threshold that the second duration is shorter than the first duration, reconfigure for the first network node, a first period of advertising for transmissions in the mesh network with a second period of advertising for transmissions in the mesh network based on the result.

17. The first network node according to claim 10, wherein the processing circuitry is configured synchronize the first network node with the second network node.

\* \* \* \* \*

UNITED STATES PATENT AND TRADEMARK OFFICE
CERTIFICATE OF CORRECTION

PATENT NO. : 10,743,343 B2  
APPLICATION NO. : 15/777240  
DATED : August 11, 2020  
INVENTOR(S) : Arvidson et al.

Page 1 of 2

It is certified that error appears in the above-identified patent and that said Letters Patent is hereby corrected as shown below:

In the Specification

In Column 5, Line 7, delete "relay nodes Note that that this" and insert -- relay nodes. Note that this --, therefor.

In Column 5, Line 8, delete "how apply" and insert -- how to apply --, therefor.

In Column 5, Line 33, delete "second node 122." and insert -- second network node 122. --, therefor.

In Column 5, Line 52, delete "takes too" and insert -- takes to --, therefor.

In Column 6, Line 9, delete "second node." and insert -- second network node. --, therefor.

In Column 7, Line 53, delete "ASIC)," and insert -- (ASIC), --, therefor.

In Column 7, Line 56, delete "SoC)." and insert -- (SoC). --, therefor.

In Column 7, Lines 60-61, delete "receiver not shown) and a wireless transmitter not shown)." and insert -- receiver (not shown) and a wireless transmitter (not shown). --, therefor.

In Column 10, Line 30, delete "network node 121" and insert -- first network node 121 --, therefor.

In Column 11, Line 31, delete "adapted the" and insert -- adapted to the --, therefor.

In Column 13, Line 14, delete "second node 122." and insert -- second network node 122. --, therefor.

In Column 14, Line 67, delete "second node 122." and insert -- second network node 122. --, therefor.

In Column 18, Lines 1-2, delete "STA which may be those described with reference to FIGS. 32 and 33." and insert -- STA. --, therefor.

Signed and Sealed this  
Fifth Day of January, 2021

Andrei Iancu  
*Director of the United States Patent and Trademark Office*

In Column 18, Lines 20-21, delete "STA which may be those described with reference to FIGS. 32 and 33." and insert -- STA. --, therefor.

In Column 18, Lines 36-37, delete "STA which may be those described with reference to FIGS. 32 and 33." and insert -- STA. --, therefor.

In Column 18, Lines 61-62, delete "STA which may be those described with reference to FIGS. 32 and 33." and insert -- STA. --, therefor.

In the Claims

In Column 22, Line 18, in Claim 17, delete "configured synchronize" and insert -- configured to synchronize --, therefor.